Sept. 9, 1952     F. GLASSFORD     2,609,893
SEALING STRUCTURE
Filed Jan. 18, 1950
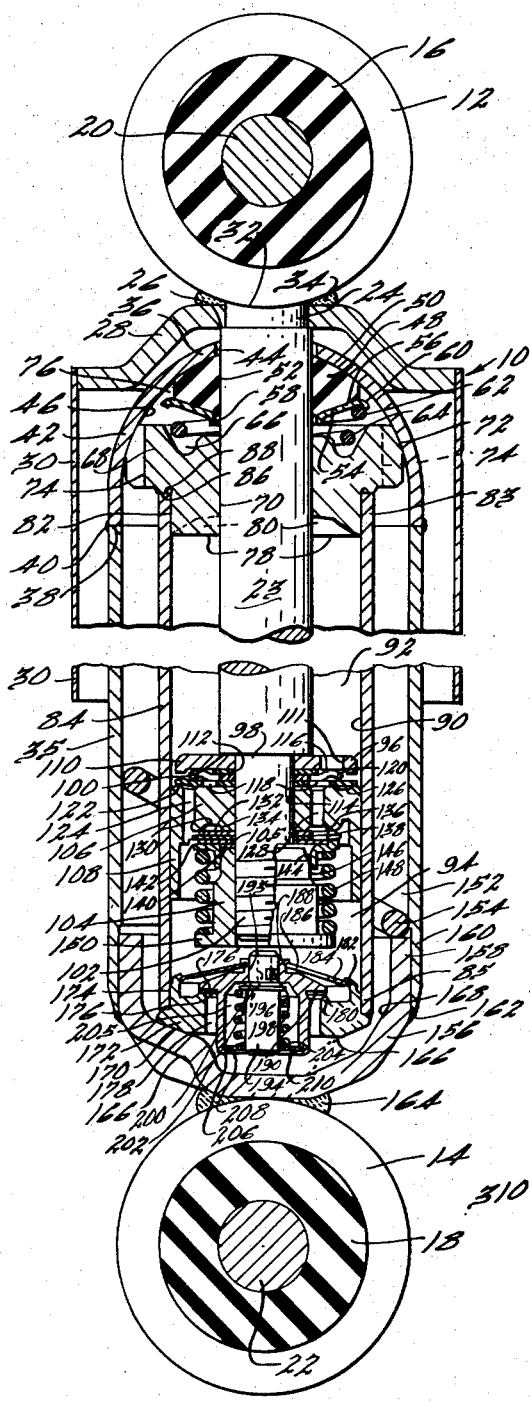
INVENTOR.
Fred Glassford.
BY
Harness and Harris
ATTORNEYS Patented Sept. 9, 1952

2,609,893

UNITED STATES PATENT OFFICE 2,609,893

SEALING STRUCTURE

Fred Glassford, Royal Oak, Mich., assignor to Chrysler Corporation, Highland Park, Mich., a corporation of Delaware Application January 18, 1950, Serial No. 139,218

14 Claims. (Cl. 188—88)

1

This invention relates to sealing structure and more particularly to an improved sealing structure applicable to shock absorbing devices.

According to a feature of the present invention there is the provision of a novel and efficient sealing means for a shock absorber of the direct acting type whereby the seal is self-centering as respects the piston rod and escape of fluid around the latter is prevented.

According to another feature there is provided a seal tending to adjusting itself relative to the piston rod whereby wear on the piston rod due to reciprocal movement is even around its girth.

According to yet another feature, a shock absorber is provided having a self-centering pilot plug on the pressure tube for reception in the seal-containing end of the reservoir tube to produce at that end a positive and uniform spacing between the foregoing tubes.

According to a further feature, a shock absorber is provided in which the step in assembly of joining the reservoir tube cap to the reservoir tube may precede the step of the insertion of internal parts such as the piston rod seal and pressure tube plug during final assembly; in those devices requiring an inverse order of precedence to the above, there lies a greater likelihood of taking foreign matter internally of the shock absorber since the full step of joining must in such instance be made with the piston rod seal and/or pressure tube plug in place internally thus forming a pocket difficult thereafter to flush clean.

According to yet a further feature, there is provided a shock absorber having a pressure tube plug and pressure tube insertable from an end in common as respects the reservoir tube such that the former two pressure members may be inserted as a sub-assembled unit; inasmuch as the pressure tube plug and pressure tube are by commercial practice press-fitted together, in the present invention the press-fitting step may take place outside the reservoir tube altogether with full access to the sub-assembler and the resulting sub-assembly then inserted in the reservoir tube through the same end of the latter.

According to still a further feature, a shock absorber is provided in which the pressure tube plug provides for positive and uniform spacing of the pressure tube with the reservoir tube at one end notwithstanding the non-coincidence of the axes of the two tubes at the opposite end as due to irregularities and non-uniformity of the base cap and base valve assembly. By orthodox construction the base cap and/or base valve serve

2 to space the lower end of the reservoir tube radially relative to the pressure tube.

With the above mentioned and other features, objects and advantages in view, the invention consists of the novel construction and combination of parts hereinafter described and illustrated in the accompanying drawing, it being understood that various changes in the form, proportion, arrangement, and details of construction such as will be suggested to one skilled in the art may be resorted to without departing from the spirit of the invention.

In the drawing:

Figure 1 is a longitudinal section of the improved device;

Figure 2 is a plastic view illustrative of a step of assembly of the device; and Figure 3 illustrates a certain self-centering feature of the invention.

Detailed reference will now be made to the accompanying drawing illustrating an improved form of direct acting hydraulic shock absorber wherein loss of fluid through leakage and uneven wear around the piston rod is substantially eliminated. In proceeding into the detailed description, it should be with the understanding that the invention may be embodied in other structures than the one preferred for illustration.

In Figure 1, the shock absorbing device 10 to which the invention has been applied, includes opposed mounting eyes 12 and 14 at the respective ends. Received in these mounting eyes are rubber-like or plastic bushings 16 and 18 which embrace parts 20 and 22 mounted respectively on two relatively movable members of the apparatus to which the shock absorbing device is to be applied, a vehicle suspension being one example. The centrally located piston rod 23 has a reduced end 24 providing a shoulder 26. Received on shoulder 26 is the end member 28 of a dust shield 30 fabricated as by welding. The end member 28 is held in place against shoulder 26 by the shock absorber eye 12, which is affixed along a surface 32 to the reduced portion 24 of the piston rod. Welding 34 or other suitable bonding techniques may be employed. A cap 36 is provided at its base with a rim 38 held by a suitable fluid-tight bond at 40 to a tubular reservoir member 35. The bond 40 consists preferably of resistance welding in the form of a butt welding operation but within its broader aspects may be crimped and spun over. Cap 36 may assume a hemispherical shape and be provided with arcuate wall portions 42 which define a central opening 44. Opening 44 is of a dimension to afford adequate clearance for reciprocable movement of piston rod 23 notwithstanding assembly misalignments. The arcuate walls 42 may be formed to present hemispherical arcuate surfaces 46 internally thereof. A rubber-like or synthetic fluid seal 48 of a non-metallic preferably is received within cap 36 and formed laterally with complemental arcuate surfaces 50 adapted to mate with surfaces 46 just mentioned. A central opening 52 is provided in seal 48 for reception of the piston rod 23 in a sealingly slidable engagement. Opposed lateral surfaces 54 formed on seal 48 engage a seat member 56 formed with a central opening 58 which provides adequate clearance in a noninterfering relationship with piston rod 23. The seat member 56 is provided with an annular flange 60 which receives a coil element 62 of a resilient member 64 which biases the seal 48 into operative position. The resilient means 64, which may be a coil spring, seats in an annular recess 66 formed in a rod guide plug 68. The rod guide plug 68 has a central opening 70 serving as a bearing for guiding movement of piston rod 23. Surfaces 72 formed on the guide plug 68 are complementally received by the surfaces 46 of the arcuate wall portions 42 of the cap. One or more passages 74 formed in the periphery of the rod guide plug serve to connect a fluid leakage collecting chamber 76 with the reservoir chamber of the shock absorber formed by reservoir member 35. Rod guide plug 68 has one or more radiating fins 78 defining intervening foam-collecting chambers 80 from which any froth or emulsion is passed into the fluid-collecting chamber 76 in a preceding order to other shock absorbing fluid operating to leak through the bearing opening 70. Surfaces 82 are received as by a press fit in the end 83 of a pressure tube 84 which carries the rod guide plug 68. A shoulder 86, undercut as at 88 on the rod guide plug, serves to seat the members 68 and 84 fixedly in place relative to one another.

Pressure tube 84 defines a working cylinder 90 operatively divided by the shock absorber piston into a rebound chamber 92 and a jounce chamber 94. The piston as a whole is indicated at 96 to include a reduced portion 98 of the piston rod 23. A shoulder 100 is provided at one end of the reduced portion noted, and a threaded portion 102 at the other end, on which is threadably received a nut 104 providing a shoulder 105 opposed to the shoulder 100. Between the said two shoulders is disposed a piston valve body 106 carrying the piston skirt 108. A washer 110 bearing against shoulder 100 is provided with one or more apertures 111. A spacer 112 is located adjacent washer 110 and next in order is to be observed a flexible spring member 116 having a plurality of radiating fingers 120. Fingers 120 cooperate with a check valve 114 providing a shiftable valving portion 122 having fluid passage ports one or more in number 118 located centrally thereof. The portion 122 of valve 114 serves to cover and close an annular depression 126 which is formed in the body member 106 such as to communicate with passages 124 extending generally longitudinally of the piston. Passages 124, which may be one or more in number, are formed about a circle of radially greater extent than another circle upon which are disposed one or more through passages 128, also formed in the piston. An annular depression 130 is formed to provide uniform discharge communication for the passages 128 and thereacross are provided valving parts 132, 134 and a backing member 140.

Valve member 132 may have one or more peripheral notches 136, and valving member 134 may have one or more peripheral notches 138. Backing member 140 is received in a spring retainer cup 142 presenting a central opening 144 slidingly cooperating with a complementary cylindrical portion 146 formed on nut 104. Spring cup 142 is urged in place by one end of a resilient member 148 which may be in the form of a coil spring. A shoulder 150 formed on nut 104 serves to seat the resilient member 148 at the opposite end thereof.

Reservoir member 35, which may be tubular, defines with the pressure tube 84 a reservoir 152 for the shock absorber fluid in which is contained an anti-aeration member 154 shown by way of illustration as a coil spring. A base cap 156 has a flange portion 158 which is received in a counterbore 160 formed in the reservoir member 35. In adjacency to the flange portion 158, the anti-aeration member 154 may be connected to one or both of base cup 156 and reservoir tube 35. By suitable welding, bonding, or crimping as at 162, base cap 156 may be firmly affixed in place with flange portion 158 being located within the reservoir tube. The mounting eye 14 of the shock absorbing device is firmly affixed to base cap 156 at 164 as by welding or a suitable bonding. One or more inwardly offset portions 166 are formed in base cap 156 thereby to define intervening passage means as at 168 which lead into the reservoir chamber 152. A portion of the base valve assembly is provided with surfaces 170 which rest on the offset portions 166 and further surfaces 174 adapted to be received as by a press-fit engagement in the lower end 85 of pressure tube 84. The base valve body part 172 has valving surfaces 176 formed to define the entrance to a central opening 178. One or more notches 180 are provided in the body member 172 so as to cause the valve surfaces 176 to be interrupted by gaps at intervals as desired. The notches 180 provide a permanent opening permitting constant communication as between reservoir 152 and jounce chamber 94. Received on lugs 182 formed on body part 172 is a biasing member 184 formed with a plurality of resilient spring fingers 186 which engage a check valve part 188. Valve part 188 has valving surfaces 190 which cooperate with the valving surfaces 176 just described. Valving part 188 defines a central opening 193 in which is received a relief valve 194. In one end of the relief valve will be observed a central bore 196 which connects with a peripheral slot 198. It will be understood that when valving part 194 assumes a position displaced downwardly from that shown, the bore and slot 196 and 198 will serve to allow communication between the jounce chamber 94 and the passage means 168 leading into reservoir 152. A shoulder 200 formed on relief valve 194 engages in an upward position of the valve the body part 188 adjacent an end of the central opening 193 formed therein. A second shoulder formed on relief valve 194 is indicated at 202 to engage a resilient member 204 which may be a coil spring serving to keep the valve in seated position. Valving part 188 defines a cylindrical recess in its base defining a chamber 205 which is bordered by inwardly directed lugs 206 on which is seated a retainer 208. The retainer is formed with one or more inwardly directed fingers 210 against which the resilient member 204 rests.

In respect to Figure 2 of the drawing, a phasic illustration appears such as will bring out the assembly of the construction features just described. It is contemplated that as a sub-assembly step the cap 36 will be transversely aligned and butt welded adjacent rim portion 38 thereof to the reservoir tube 35 to form the outer casing for the shock absorbing device. After the butt welding step is accomplished, a unitary structure will result having an opening 44 of reduced size at one end and an entirely open counterbored end at 160. Inasmuch as the piston rod guide 68 and the pressure tube 84 may be introduced, owing to the unique principles of construction involved, through the same end of the casing, it is possible as a further sub-assembly step to press fit plug 68 into pressure tube 84 previous to any further assembly of the shock absorbing device. As the two sub-assemblies just mentioned are brought together, the complementary surfaces 72 and 46 formed on the casing and the pressure tube sub-assembly respectively serve to pilot the pressure tube assembly internally into place and to center it relative to the reservoir member 35 at least in the region of cap 36. It is to be appreciated that if the butt welding operation causes the rim 38 to fuse unevenly and to unite with reservoir tube 35 such that the cap is slightly canted relative to the reservoir tube, still since hemispherical surfaces are involved, the pilot surfaces 72 will nevertheless cause the axes of plug 68 and casing 35 to be coincident. As the mating surfaces 46 and 72 approach one another the resilient member 64 will be compressed to urge the spring seat 56 and seal 48 into self-centering disposition relative to the piston rod. The direction of taper of the seat member 56 is shown as being opposite to the direction of convergence of the arcuate walls 42. It will be readily apparent that if the outer and inner tubes 35 and 84 are not in coincidence at their lower end due to some assembly difficulty with base cap 156 and the base valve, still the surfaces 46 and 72 will allow movement at the opposite end of the tubes relative to one another such that the said opposite end will be self-centering despite any existing canting between the two tubes adjacent the base cap.

As respects Figure 3 of the drawing, a somewhat exaggerated view of a shock absorber 310 appears in which the central axis of the base cap 272 is disposed at a discernible angle to the central axis 270 of the pressure tube and piston rod. Such a possibility may be found to exist by reason of the canting of the inner and outer tube relative to one another at their lower ends or by uneven butt welding between the cap 236 and reservoir tube 235 the same as noted above, or perhaps a combination thereof. In any case since the central axis 272 of cap 236 is canted, the piston rod will seek a position in the central opening 250 of the base cap which relatively is slightly off center. The piston rod seal 248 will tend to center itself relative to the path of motion of the piston rod by a slidingly tiltable shift transverse of the shock absorber casing from what may be an initial position 248', which latter position will be seen to be centralized relative to the canted cap 236.

For an understanding of the operation of the devices of Figures 1 through 3, the stroke during which the shock absorber parts collapse will be termed for convenience sake, the jounce stroke and the stroke during which the shock absorber parts extend relative to one another will be referred to as the rebound stroke. During jounce, piston 96 will move downwardly in the cylinder and the damping fluid will tend to move past the piston through passages 124 and will unseat the valve portion 122, which acts as a check valve, and make its way through ports 111 into the rebound chamber 92. Simultaneously, the volume of damping fluid displaced by piston rod 23 will at slow speeds of jounce tend to pass spring fingers 186 in the base valve, enter notches 180 into the central opening 178 of the base valve, and pass through passage means 168 into reservoir 152. As higher jounce speeds transpire, the pressure in jounce chamber 94 will rise and cause relief valve 194 to unseat and allow additional fluid to pass through bore 196, slot 198, and into the central cylindrical passage 205 defined by check valve part 188. This additional fluid will then make its way into reservoir 152.

At the beginning of the rebound stroke the damping fluid will make its way from the reservoir tending to be drawn through the base valve so as to unseat the check valve part 188 and allow relatively free passage of fluid between the valving surfaces 176 and 190. This fluid will then pass into jounce chamber 94. The fluid trapped above the piston in the rebound chamber 92 will pass through opening 111 of the top of the piston and since check valve 122 will close, will then make its way past spring fingers 120 and the openings 118 into passages 128. From the annular recess 130 formed in communication with passages 128, the fluid will pass through the peripheral notches 136 and 138 formed in valve members 132 and 134 respectively. With higher speeds of rebound, the flow past the piston will be supplemented owing to the fact that the valve parts 132, 134, and 140 wil be lifted from their seats incident to rising fluid pressure resulting in compression of the resilient member 148. After sufficient pressure is reached to lift the valve off its seat during rebound, the balance of the stroke may continue at a relatively constant resistive force. Any voids trapped in the rebound chamber during rebound stroke will tend to be collected first in the upper chambers 80 and passed out with leakage fluid into the fluid-collecting chamber 76 for eventual reentry into the reservoir through passage 74. Relative to emulsion in the reservoir, the fluid will seek a lower level and the anti-aerating device will tend to keep the froth or emulsion from the main body of fluid in the reservoir.

From a study of the subject matter just disclosed, it will readily be apparent that an improved shock absorbing device has been provided in which any uneven wear on the piston rod is precluded due to the fact that the piston rod seal is self-centering. It will be further apparent that in event the outer and inner tubes 35 and 84 are not exactly coincident at their lower ends still these tubes will be made coincident at their upper ends by virtue of a ball joint or universal swiveling action between the rod guide plug and the upper cap for the casing.

What is claimed is:

1. In a shock absorber, a casing having a tubular side wall and an arcuate end wall connected thereto having an end opening therein, a working cylinder in the casing having a plug at one end provided with a central opening and having surfaces engaging the walls of the casing in spaced relation to said end opening and forming a chamber between said plug and said end opening, a flexible non-metallic packing in said chamber having an arcuate surface adapted to engage said arcuate end wall complementally in a tiltingly slidable relationship, said packing having an opening centrally of said arcuate packing surface, and a resilient element acting in said chamber between said plug and packing to urge said arcuate surface of the latter into engagement with said arcuate end wall and resiliently permitting the aforesaid tilting by slidable movement of the packing to effect appropriate registry with the aforesaid openings.

2. In a shock absorber, a casing having a tubular side wall and an arcuate end wall connected thereto having an end opening therein, a working cylinder in the casing having a plug at one end provided with a central opening and having an arcuate surface engaging said arcuate end wall of the casing in spaced relation to said end opening and forming a chamber between said plug and said end opening, a flexible non-metallic packing in said chamber having an arcuate surface adapted to engage said arcuate end wall complementally in a tiltingly slidable relationship, said packing having an opening centrally of said arcuate packing surface, and a resilient element acting in said chamber between said plug and packing to urge said arcuate surface of the latter into engagement with said arcuate end wall and resiliently permitting the aforesaid tilting by slidable movement of the packing to effect appropriate registry of the aforesaid openings.

3. In a shock absorber, a tubular member having an end and a longitudinal axis, a cap including a substantially semi-spherical crown portion and a rim portion at the base thereof welded fluid tight to the end of the tubular member, said crown portion having an opening substantially concentric with the central axis of the cap, a working cylinder in the tubular member having a plug at the end thereof adjacent the welded end of said tubular member and formed with a central opening coaxial with the working cylinder, said plug having surfaces complementary to internal surface portions of said cap and universally slidable therein to accommodate centering of the axis of the central opening of said plug with the axis of the tubular member notwithstanding misalignment of the latter and the central axis of the cap.

4. In a shock absorber, a tubular member having an end and a longitudinal axis, a cap having a central axis and including a substantially semi-spherical crown portion and a rim portion at the base thereof butt-welded fluid tight to the end of the tubular member in transversely aligned continuation thereof, a working cylinder in the tubular member having a plug at the end thereof adjacent the butt-welded end of said tubular member and formed with a central opening coaxial with the working cylinder, said plug having surfaces complementary to internal surface portions of said cap and universally slidable therein to accommodate centering of the axis of the central opening thereof with the axis of the tubular member notwithstanding misalignment of the latter with central axis of the cap owing to fabrication irregularities as due to butt-welding operations.

5. In a sealing structure of the character described, the combination with a tubular casing having a reduced end provided at its extremity with an opening and including converging arcuate internal surface portions, of a reciprocable shaft extending non-interferingly through said opening into the casing, a tapered spring seat in the casing surrounding the shaft and surrounded by said internal arcuate converging surface portions with its direction of taper opposite to the direction of convergence of said arcuate surface portions, a non-metallic sealing ring interposed between said spring seat and said converging arcuate internal surfaces having an opening through which said shaft sealingly extends and having opposed faces adapted to fit complementally to said spring seat and arcuate surfaces respectively, said spring seat having a flange projecting radially beyond said sealing ring, a spring mounted in the casing in surrounding relation to the shaft and having a coil element embraced by the projecting flange of the spring seat, said spring acting in a direction to urge the complemental face of the sealing ring into engagement with the said internal arcuate surfaces and cooperating with the same to permit resilient centering of the sealing ring relative to the path of motion of said reciprocable shaft.

6. In a sealing structure of the character described, the combination with a tubular casing having a reduced end provided at its extremity with an opening and including arcuate annular internal surface portions converging toward said extremity opening with ever decreasing inside diameter, of a reciprocable shaft extending non-interferingly through said opening into the casing, a spring seat in the casing surrounding the shaft and surrounded by said internal annular arcuate surface portions, a pressure tube assembly having a plug at one end and being provided with surface presenting portions engaging internal surface portions of said casing at a region spaced from the end opening of the latter, a non-metallic sealing ring spaced at all points from said pressure tube assembly in a position connected between and engaging said spring seat and said internal annular arcuate surfaces and having an opening through which said shaft sealingly extends, said internal annular arcuate surface portions presenting unobstructed inner surfaces of substantial lateral extent generally beyond the dimensions of the piston rod seal and adapted to permit engaged sliding therealong of the seal toward and away from the pressure tube assembly spaced relative thereto, a spring mounted in the casing in surrounding relation to the shaft and having a coil element embraced by the spring seat, said spring acting in a direction to urge sealing ring into engagement with the said internal annular arcuate surfaces of ever decreasing inside diameter and cooperating with the same to permit resilient centering of the sealing ring relative to the path of motion of said reciprocable shaft.

7. In a shock absorber, the combination with a reservoir member including a tubular main body portion having a substantially constant inside diameter and an open end, and including a cap at the other end of said main body portion provided with a piston-rod opening of a lesser dimension than said constant inside diameter, said cap having annular wall portions of ever decreasing inside diameter located between said opening and said main body portion and said cap being fixed fluid tight to the other end of said main body portion, of a piston rod seal introducible through said open end of said main body portion for engagement with the inside of said annular wall portions adjacent the piston rod opening, a pressure cylinder provided at one end with a rod-guide plug having lateral engageable surfaces, said pressure cylinder and rod-guide plug having a smaller dimension than said constant inside diameter for accommodating their introduction through said open end of said tubular body portion whereby the rod-guide plug and pressure cylinder may be advanced into said reservoir member in assembled relation to bring said lateral engageable surfaces into contact with said annular walls, said plug being spaced from said piston-rod opening and seal by contact of said engageable surfaces and said annular wall portions, and interposed resilient means acting between said seal and rod-guide plug.

8. In a shock absorber, the combination with a reservoir member including a tubular main body portion having a substantially constant inside diameter and an open end and including a cap at the other end of said main body portion provided with a piston-rod opening of a lesser dimension than said constant inside diameter, said cap having curved annular wall portions of ever decreasing inside diameter located between said opening and said main body portion and said cap being fixed fluid-tight to the opposite end of said main body portion, of a piston rod seal introducible through said open end of said main body portion for engagement with the inside of said annular wall portions adjacent the piston rod opening, a pressure cylinder provided at one end with a rod-guide having lateral engageable surfaces of complemental curvature to said curved annular walls, said pressure cylinder and rod-guide plug having a smaller dimension than said constant inside diameter for accommodating their introduction through said open end of said tubular body portion whereby the rod-guide plug and pressure cylinder may be advanced into said reservoir member in assembled relation and the lateral engageable surfaces be caused to contact said curved annular walls, said plug being spaced from said piston-rod opening and seal by contact of said engageable surfaces and said annular wall portions, and interposed resilient means acting between said seal and rod-guide plug.

9. In a shock absorber of the fluid displacement type the combination of a plurality of tubular members arranged to provide a working cylinder and a reservoir around said cylinder, a plug in an end of one of said members for preventing direct communication between the working cylinder and reservoir having arcuate portions in swivel engagement with the other member for spacing said members at one end and accommodating swivel movement of the tubular members while being maintained in operative spaced relation by said plug, and means forming a fluid collecting chamber in adjacency to the plug.

10. In a shock absorber of the fluid displacement type the combination of a plurality of tubular members arranged to provide a working cylinder and a reservoir around said cylinder, a plug in an end of one of said members for preventing direct communication between the working cylinder and reservoir and having arcuate portions in swivel engagement with another said member for spacing said members at one end and accommodating swivel movement of said members while being maintainind in operative spaced relation by said plug, and means forming a fluid collecting chamber in adjacency to the plug, said plug being formed with means providing for passage of fluid between said collecting chamber and reservoir.

11. In a shock absorber the combination of a plurality of tubular members arranged to provide a working cylinder and a reservoir around said cylinder, a plug mutually engaging and physically spacing said members at one end and in interposition thereat to prevent direct communication between the working cylinder and reservoir, means forming a fluid collecting chamber in adjacency to the plug, said plug having means associated therewith forming a ball joint with one tubular member permitting limited tilting movement of the other tubular member therewith while being maintained in operative spacing by said plug, and passage means at the ball joint providing communication between said collecting chamber and reservoir.

12. In a shock absorber of the direct acting type having a casing, the combination of a transversely disposed plug, a plurality of tubular parts generally arranged on one side of the plug to provide a working cylinder and a reservoir around said cylinder, and means defining a fluid collecting chamber on the other side of the plug having a piston rod opening therein spaced from said plug and of a lesser dimension, said means including walls extending from the opening generally outwardly and in a direction axially toward the plug for engagement with the latter, and a piston rod seal of a predeterminedly greater dimension than said piston rod opening, said walls presenting unobstructed inner surfaces of lateral extent generally beyond the dimensions of said piston rod seal and adapted to permit engaged sliding therealong of the seal in transverse movement of the latter relative to the plug and casing.

13. In a shock absorber of the direct acting type, the combination of a transversely disposed plug, a plurality of tubular parts generally arranged on one side of the plug to provide a working cylinder and a reservoir around said cylinder, means defining a fluid collecting chamber on the other side of the plug having a piston rod opening in spacing to the plug and of a lesser dimension, walls extending from the opening generally outwardly and in a direction axially toward the plug to a point of engagement with the latter, a piston rod seal of a predeterminedly greater dimension than said piston rod opening, and resilient means acting between the seal and plug, said walls presenting unobstructed inner surfaces of substantial lateral extent beyond the dimensions of said piston rod seal and being adapted to permit engaged sliding therealong of the seal in transverse movement of the latter relative to the plug, and passage means in the periphery of said plug radially beyond said resilient means providing for passage of fluid between said fluid collecting chamber and reservoir.

14. In a shock absorber, the combination with a reservoir member including a tubular main body portion having a substantially constant inside diameter and an open end, and including a cap at the opposite end of said main body portion provided with a piston-rod opening of a lesser dimension than said constant inside diameter, said cap having annular wall portions of ever decreasing inside diameter located between said opening and said main body portion and said cap being joined fluid-tight to the opposite end of said main body portion, and a piston rod seal introducible through said open end of said main body portion for engagement with the inside of said annular wall portions adjacent the piston rod opening, of a sub-assembly constituted by a pressure cylinder and a rod-guide plug provided with engageable surfaces some of which are adapted to be press-fit into reception in the pressure cylinder during fabrication of said sub-assembly to form an integrated unit, said pressure cylinder and rod-guide plug having a smaller dimension than said constant inside diameter for accommodating introduction of the integrated sub-assembly through the open end of said tubular body portion whereby the sub-assembly may be advanced into said reservoir member to bring other said plug engageable surfaces into contact with said annular wall portions.

FRED GLASSFORD.

REFERENCES CITED

The following references are of record in the file of this patent:

UNITED STATES PATENTS

| Number | Name | Date |
| --- | --- | --- |
| 2,481,210 | Funkhouser | Sept. 6, 1949 |